US012219933B1

(12) United States Patent
Anderton

(10) Patent No.: US 12,219,933 B1
(45) Date of Patent: Feb. 11, 2025

(54) SYSTEM AND METHOD FOR TRACKING AN ANIMAL AND FOR PREVENTING THE ANIMAL FROM ATTACKING ANOTHER ANIMAL

(71) Applicant: Protect Animals with Satellites, LLC, Upper Saddle River, NJ (US)

(72) Inventor: Terry Anderton, Portsmouth, NH (US)

(73) Assignee: Protect Animals with Satellites, LLC

( * ) Notice: Subject to any disclaimer, the term of this patent is extended or adjusted under 35 U.S.C. 154(b) by 79 days.

(21) Appl. No.: 17/484,235

(22) Filed: Sep. 24, 2021

Related U.S. Application Data

(60) Provisional application No. 63/082,739, filed on Sep. 24, 2020.

(51) Int. Cl.
*A01K 27/00* (2006.01)
*A01K 29/00* (2006.01)

(52) U.S. Cl.
CPC .......... *A01K 27/009* (2013.01); *A01K 29/005* (2013.01)

(58) Field of Classification Search
CPC ... A01K 27/009; A01K 27/001; A01K 29/005
See application file for complete search history.

(56) References Cited

U.S. PATENT DOCUMENTS

| | | | |
|---|---|---|---|
| 5,067,441 A | 11/1991 | Weinstein | |
| 5,576,994 A | 11/1996 | Kato et al. | |
| 5,749,324 A * | 5/1998 | Moore | A01K 27/009 119/718 |
| 5,857,433 A | 1/1999 | Files | |
| 5,868,100 A | 2/1999 | Marsh | |
| 6,043,748 A | 3/2000 | Touchton et al. | |
| 6,166,643 A | 12/2000 | Janning et al. | |
| 6,232,880 B1 | 5/2001 | Anderson et al. | |
| 6,232,916 B1 | 5/2001 | Grillo et al. | |
| 6,271,757 B1 | 8/2001 | Touchton et al. | |
| 6,487,992 B1 | 12/2002 | Hollis | |
| 6,581,546 B1 | 6/2003 | Dalland et al. | |
| 6,683,564 B1 | 1/2004 | McBurney | |
| 6,700,492 B2 | 3/2004 | Touchton et al. | |

(Continued)

FOREIGN PATENT DOCUMENTS

| | | |
|---|---|---|
| CA | 2865966 C | 7/2021 |
| CN | 101713822 B | 8/2013 |

(Continued)

OTHER PUBLICATIONS

Alvaro Llaria; Geolocation and Monitoring Platform for Extensive Farming in Mountain Pastures ("Llaria"); IEEE International Conference on Industrial Technology (ICIT), pp. 2420-2425; Mar. 19, 2015.

(Continued)

*Primary Examiner* — Joshua D Huson
*Assistant Examiner* — Alanna K Peterson
(74) *Attorney, Agent, or Firm* — Troutman Pepper Hamilton Sanders LLP; James E. Schutz; Korbin M. Blunck

(57) ABSTRACT

A detection and deterrent method and system for detecting and deterring a pet from attacking another animal including a collar configured to be affixed to a pet, the collar having a motion sensor. The collar is configured to determine when a pet is about to attack another animal and to deter the pet from attacking the animal.

14 Claims, 11 Drawing Sheets

(56) References Cited

U.S. PATENT DOCUMENTS

| | | |
|---|---|---|
| 6,903,682 B1 | 6/2005 | Maddox |
| 6,928,958 B2 | 8/2005 | Crist et al. |
| 7,000,570 B2 | 2/2006 | Napolez et al. |
| 7,017,524 B2 | 3/2006 | Gillis et al. |
| 7,046,152 B1 | 5/2006 | Peinetti et al. |
| 7,068,174 B1 | 6/2006 | Peinetti et al. |
| 7,110,777 B2 | 9/2006 | Duncan |
| 7,111,586 B2 | 9/2006 | Lee et al. |
| 7,117,822 B1 | 10/2006 | Peinetti et al. |
| 7,174,855 B2 | 2/2007 | Gerig et al. |
| 7,198,009 B2 | 4/2007 | Crist et al. |
| 7,204,204 B1 | 4/2007 | Peinetti et al. |
| 7,222,589 B2 | 5/2007 | Lee, IV et al. |
| 7,252,051 B2 | 8/2007 | Napolez et al. |
| 7,259,718 B2 | 8/2007 | Patterson et al. |
| 7,278,376 B1 | 10/2007 | Peinetti et al. |
| 7,343,879 B2 | 3/2008 | Gerig et al. |
| 7,345,588 B2 | 3/2008 | Gerig |
| 7,360,505 B2 | 4/2008 | Gerig et al. |
| 7,394,390 B2 | 7/2008 | Gerig |
| 7,409,924 B2 | 8/2008 | Kates |
| 7,495,570 B1 | 2/2009 | Peinetti et al. |
| 7,552,699 B2 | 6/2009 | Moore |
| 7,565,885 B2 | 7/2009 | Moore |
| 7,602,302 B2 | 10/2009 | Hokuf et al. |
| 7,667,642 B1 | 2/2010 | Frericks et al. |
| 7,710,263 B2 | 5/2010 | Boyd |
| 7,779,788 B2 | 8/2010 | Moore |
| 7,861,676 B2 | 1/2011 | Kates |
| 7,946,252 B2 | 5/2011 | Lee, IV et al. |
| 8,011,327 B2 | 9/2011 | Mainini et al. |
| 8,018,334 B1 | 9/2011 | DiMartino et al. |
| 8,152,745 B2 | 4/2012 | Smith et al. |
| 8,239,133 B2 | 8/2012 | Wang et al. |
| 8,342,135 B2 | 1/2013 | Peinetti et al. |
| 8,430,064 B2 | 4/2013 | Groh et al. |
| 8,436,735 B2 | 5/2013 | Mainini |
| 8,448,607 B2 | 5/2013 | Giunta |
| 8,704,728 B2 | 4/2014 | Mujahed et al. |
| 8,736,499 B2 | 5/2014 | Goetzl et al. |
| 8,779,925 B2 | 7/2014 | Rich et al. |
| 8,803,692 B2 | 8/2014 | Goetzl et al. |
| 8,823,513 B2 | 9/2014 | Jameson et al. |
| 8,839,744 B1 | 9/2014 | Bianchi et al. |
| 8,934,923 B1 | 1/2015 | Golden |
| 8,935,093 B2 | 1/2015 | Chansarkar |
| 8,939,111 B2 | 1/2015 | Berntsen |
| 8,947,240 B2 | 2/2015 | Mainini |
| 8,947,241 B2 | 2/2015 | Trenkle et al. |
| 8,955,462 B1 | 2/2015 | Golden |
| 8,972,180 B1 | 3/2015 | Zhao et al. |
| 8,978,592 B2 | 3/2015 | Duncan et al. |
| 9,146,113 B1 | 9/2015 | Funk et al. |
| 9,173,380 B2 | 11/2015 | Trenkle et al. |
| 9,258,982 B1 | 2/2016 | Golder |
| 9,538,329 B1 | 1/2017 | Vivathana |
| 9,648,849 B1 | 5/2017 | Vivathana |
| 9,654,925 B1 | 5/2017 | Solinsky et al. |
| 9,848,295 B1 | 12/2017 | Mason et al. |
| 9,861,076 B2 | 1/2018 | Rochelle et al. |
| 9,922,522 B2 | 3/2018 | Solinsky et al. |
| 9,924,314 B2 | 3/2018 | Solinsky et al. |
| 9,980,463 B2 | 5/2018 | Milner et al. |
| 10,045,512 B2 | 8/2018 | Mainini et al. |
| 10,151,843 B2 | 12/2018 | McFarland et al. |
| 10,154,651 B2 | 12/2018 | Goetzl et al. |
| 10,228,447 B2 | 3/2019 | Rich et al. |
| 10,231,440 B2 | 3/2019 | Seltzer et al. |
| D851,339 S | 6/2019 | Solinsky et al. |
| 10,356,585 B2 | 7/2019 | Ling et al. |
| 10,444,374 B2 | 10/2019 | Park et al. |
| 10,674,709 B2 | 6/2020 | Goetzl et al. |
| 10,806,126 B1 | 10/2020 | Loewke et al. |
| 10,842,129 B1 | 11/2020 | Anderton et al. |
| 10,863,718 B1* | 12/2020 | Lazarevic ............ A01K 15/023 |
| 10,955,521 B2 | 3/2021 | Seltzer |
| 10,986,813 B2 | 4/2021 | Seltzer et al. |
| 11,013,214 B2 | 5/2021 | Anderton et al. |
| 11,166,435 B2 | 11/2021 | Anderton et al. |
| 11,470,814 B2 | 10/2022 | Goetzl et al. |
| 11,553,692 B2 | 1/2023 | Goetzl et al. |
| 2005/0009376 A1 | 1/2005 | Gotz et al. |
| 2005/0066912 A1 | 3/2005 | Korbitz et al. |
| 2006/0197672 A1 | 9/2006 | Talamas, Jr. et al. |
| 2006/0247847 A1 | 11/2006 | Carter et al. |
| 2007/0204804 A1 | 9/2007 | Swanson et al. |
| 2008/0035072 A1 | 2/2008 | Lee |
| 2008/0036610 A1 | 2/2008 | Hokuf et al. |
| 2008/0272920 A1 | 11/2008 | Brown |
| 2009/0309789 A1 | 12/2009 | Verechtchiagine |
| 2010/0097208 A1 | 4/2010 | Rosing et al. |
| 2010/0111359 A1* | 5/2010 | Bai ...................... A01K 29/005 382/103 |
| 2010/0139576 A1 | 6/2010 | Kim et al. |
| 2010/0161271 A1 | 6/2010 | Shah et al. |
| 2011/0140884 A1 | 6/2011 | Santiago et al. |
| 2011/0298615 A1 | 12/2011 | Rich et al. |
| 2012/0206454 A1 | 8/2012 | Alasaarela |
| 2012/0209730 A1 | 8/2012 | Garrett |
| 2013/0044025 A1 | 2/2013 | Chiu |
| 2013/0127658 A1 | 5/2013 | McFarland et al. |
| 2013/0157628 A1 | 6/2013 | Kim et al. |
| 2013/0179204 A1 | 7/2013 | Sabarez, II |
| 2013/0225282 A1 | 8/2013 | Williams et al. |
| 2013/0271281 A1 | 10/2013 | Jessop |
| 2013/0332064 A1 | 12/2013 | Funk et al. |
| 2014/0002239 A1 | 1/2014 | Rayner |
| 2014/0002307 A1 | 1/2014 | Mole et al. |
| 2014/0012094 A1 | 1/2014 | Das et al. |
| 2014/0048019 A1 | 2/2014 | So |
| 2014/0230755 A1* | 8/2014 | Trenkle ............... A01K 27/009 340/573.3 |
| 2014/0261235 A1 | 9/2014 | Rich et al. |
| 2014/0320347 A1 | 10/2014 | Rochelle et al. |
| 2014/0335887 A1 | 11/2014 | Liu et al. |
| 2014/0352632 A1 | 12/2014 | McLaughlin |
| 2015/0065167 A1 | 3/2015 | Scalisi |
| 2015/0107531 A1 | 4/2015 | Golden |
| 2015/0181840 A1 | 7/2015 | Tupin, Jr. et al. |
| 2015/0219767 A1 | 8/2015 | Humphreys et al. |
| 2015/0269624 A1 | 9/2015 | Cheng et al. |
| 2015/0373951 A1* | 12/2015 | Kelly .................... A01K 29/005 340/573.3 |
| 2016/0007888 A1 | 1/2016 | Nieminen et al. |
| 2016/0097861 A1 | 4/2016 | Li et al. |
| 2016/0150362 A1 | 5/2016 | Shaprio et al. |
| 2016/0178392 A1 | 6/2016 | Goldfain |
| 2016/0259061 A1 | 9/2016 | Carter |
| 2016/0278346 A1 | 9/2016 | Golden et al. |
| 2017/0066464 A1 | 3/2017 | Carter et al. |
| 2017/0265432 A1 | 9/2017 | Anderton et al. |
| 2017/0372580 A1 | 12/2017 | Vivathana |
| 2018/0125038 A1* | 5/2018 | Hord ..................... G08B 15/00 |
| 2019/0029221 A1 | 1/2019 | Anderton et al. |
| 2020/0267941 A1 | 8/2020 | Seltzer et al. |
| 2021/0045353 A1* | 2/2021 | Ehrman ............... A01K 27/001 |
| 2021/0274754 A1* | 9/2021 | Talley .................. A44B 11/266 |
| 2022/0068142 A1 | 3/2022 | Anderton |
| 2022/0236367 A1 | 7/2022 | Seltzer et al. |
| 2022/0256812 A1 | 8/2022 | Huber et al. |
| 2022/0257132 A1 | 8/2022 | Huber et al. |
| 2022/0287577 A1 | 9/2022 | Huber et al. |
| 2023/0039951 A1 | 2/2023 | Seltzer et al. |
| 2023/0240269 A1 | 8/2023 | Mainini et al. |
| 2023/0301532 A1 | 9/2023 | Huber et al. |

FOREIGN PATENT DOCUMENTS

| | | |
|---|---|---|
| CN | 105393139 B | 7/2019 |
| FR | 2869691 A1 | 11/2005 |
| JP | 10260055 A | 9/1998 |
| JP | 10295212 A | 11/1998 |
| JP | 4787762 B2 | 10/2011 |
| JP | 2015139667 A | 8/2015 |

(56) References Cited

FOREIGN PATENT DOCUMENTS

| | | | |
|---|---|---|---|
| KR | 102265654 B1 | 6/2021 | |
| WO | 1997024577 A3 | 10/1997 | |
| WO | 2000057692 A1 | 10/2000 | |
| WO | WO-2007015186 A1 * | 2/2007 | ........... A01K 15/021 |
| WO | 2014151064 A1 | 9/2014 | |
| WO | 2014182420 A2 | 11/2014 | |
| WO | 2015173712 A1 | 11/2015 | |
| WO | WO-2016010906 A1 * | 1/2016 | ........... A01K 11/008 |
| WO | 2016067116 A1 | 5/2016 | |

OTHER PUBLICATIONS

D. M. Anderson; Virtual Fencing—Past, Present and Future ("Anderson II"); The Rangeland Journal vol. 26, pp. 65-78.

Johnathan Chang, et al.; Wireless Pet Containment ("Chang"); Rutgers University, Electrical and Computer Engineering Department, Capstone Design Projects, Team Project No. SP16-002; Feb. 22, 2016.

W. Randolph Franklin, PNPOLY—Point Inclusion in Polygon Test W. Randolph Franklin (WRF), May 18, 2005, https://web.archive.org/web/20050518083531/http://www.ecse.rpi.edu/Homepages/wrf/Research/Short_Notes/pnpoly.html ("Franklin").

Kai Hormann, et al.; The Point in Polygon Problem for Arbitrary Polygons ("Hormann"); Computational Geometry, vol. 20 Issue 3; Nov. 2001.

Alejandro Weinstein; Distance from a Point to a Polygon ("Weinstein"); Matlab Central File Exchange; Apr. 1, 2008.

Donald H. House, Chapter 9—Raycasting Polygonal Models, Dec. 28, 2013, https://web.archive.org/web/20131228085233/http://people.cs.clemson.edu/~dhouse/courses/405/notes/raypolygon.pdf ("House").

Andrea Antonia Serra, et al.; A Low-Profile Linearly Polarized 3D PIFA for Handheld GPS Terminals ("Serra"); IEEE Transactions on Antennas and Propagation, vol. 58, No. 4, pp. 1060-1066; Jan. 26, 2010.

Paul D Groves, et al.; Context Detection, Categorization and Connectivity for Advanced Adaptive Integrated Navigation ("Groves"); Institute of Navigation GNSS+ 2013, Sep. 16-20, 2013, Nashville, TN, USA; Sep. 20, 2013.

Jeffrey David Miller; A Maximum Effort Control System for the Tracking and Control of a Guided Canine; A dissertation submitted to the Graduate Faculty of Auburn University in partial fulfillment of the requirements for the Degree of Doctor of Philosophy; Dec. 13, 2010; 216 pages.

Arun Vydhyanathan, et. al.; The Next Generation Xsens Motion Trackers for Industrial Applications ("Xsens"); 2015 Whitepaper published by Xsens regarding Motion Trackers (Version 2.0.1); 2015.

SiRF Technology Inc.; SiRF Demo UserGuide ("SiRF"); Mar. 2016.

Stefan Schirra; How Reliable are Practical Point-in-Polygon Strategies? ("Schirra"); 16th European Symposium on Elgorithms (ESA); 2008.

Collision Course II: Ray-Polygon-Intersection ("Claus"); Phys.ik.cx; Apr. 28, 2016.

LMU User's Guide ("LMU"); CalAmp DataCom Inc.; Dec. 2009.

Salvatore John Giunta; Garmin DC50 Dog Collar ("Garmin DC50"); 2013.

The Whistle GPS Pet Tracker & Activity Monitor ("Whistle"); Whistle Labs Inc.; 2015.

Tractive GPS Pet Tracker ("Tractive"); Tractive GmbH; 2013.

Tagg—The Pet Tracker ("Tagg"); Snaptracs Inc./Qualcomm Incorporated; 2011.

NoFence; Nofence AS; 2016.

Directional Virtual Fencing (DVF) Devices ("DVF"); United States Department of Agriculture Research / Massachusetts Institute of Technology; 2007.

Invisible Fence Brand GPS 2.0 ("Invisible Fence"); Invisible Fence, Inc.; 2015.

PeTrak Electric Fence ("PeTrak"); PeTrak, LLC; 2012.

Wolf-Tek Pet Collar ("Wof-Tek"); Wolf-Tek, LLC; 2015.

Mastrack Tracking System ("MasTrack"); MasTrack, LLC; 2015.

GPS Trackit ("GPS Trackit"); GPS Trackit, LLC; 2013.

Life 360 Family Safe Assist and Driver Protect ("Life360"); Life360 Inc.; May 25, 2016.

Geozilla Family Locator ("GeoZilla"); GeoZilla, Inc.; Apr. 2, 2016.

Fleetsat GPS Tracking Solutions ("Fleetsat"); Fleetsat Inc.; Jan. 3, 2015.

Trimble Aardvark DR + GPS ("Aardvark"); Trimble Navigation Limited; Jun. 29, 2012.

Round Solutions Nano Tracker Tracking Device ("NanoTracker"); Round Solutions GMBH & Co Kg; Apr. 18, 2016.

Zack Butler, Peter Corke, Ron Peterson, Daniela Rus; Virtual Fences for Controlling Cows; Dartmouth College Department of Computer Science; CSIRO Manufacturing & Infrastructure Technology Brisbane; MIT Computer Science and Artificial Intelligence Laboratory; New Orleans, LA; Apr. 2004; 9 pages.

Yilmaz Kemal Yüce, et al.; An alternative approach to overcome ethical issues of geotracking patients with Alzheimer's disease; 7th International Symposium on Health Informatics and Bioinformatics; 2012.

Bogdan Târnaucă, et al.; Using Complex Event Processing for implementing a geofencing service; IEEE 11th International Symposium on Intelligent Systems and Informatics (SISY); Nov. 14, 2013.

Arun Vydhyanathan et al.; The Next Generation Xsens Motion Trackers for Industrial Applications; Xsens; 2015; 9 pages.

Berbakov et al.; Smart-Phone Application for Autonomous Indoor Positioning; Proceedings of the IEEE International Instrumentation and Measurement Technology Conference; May 14, 2015; pp. 670-374.

How to check if a given point lies inside or outside a polygon?—Geeks for Geeks, Jul. 11, 2013, https://web.archive.org/web/20130715200034/http://www.geeksforgeeks.org/how-to-check-if-a-given-point-lies-inside-a- polygon ("Geeks").

Vivek Shah, When is a Point Inside a Polygon?, May 17, 2013, https://web.archive.org/web/20130517010213/http://cgatglance.blogspot.com/ ("Shah").

Collision Course II: Ray-Polygon-Intersection, Apr. 28, 2016, https://web.archive.org/web/20161021075420/http://phys.ik.cx/ ("Claus").

A. Bahga and V. Madisetti, "Cloud-Based Information Technology Framework for Data Driven Intelligent Transportation Systems," Journal of Transportation Technologies, vol. 3 No. 2, 2013, pp. 131-141. doi: 10.4236/jtts.2013.32013.

Prasad, S., Weeks, M., Zhang, Y., Zelikovsky, A., Belkasim, S., Sunderraman, R., & Madisetti, V. (2002). Mobile Fleet Application using Soap and System on Devices (SYD) Middleware Technologies. Communications, Internet, and Information Technology.

Madisetti, Vijay, et al. (2004). SyD: A Middleware Testbed for Collaborative Applications over Small Heterogeneous Devices and Data Stores. 3231. 352-371. 10.1007/978-3-540-30229-2_19.

* cited by examiner

SYSTEM AND METHOD FOR TRACKING AN ANIMAL AND FOR PREVENTING THE ANIMAL FROM ATTACKING ANOTHER ANIMAL

PRIORITY CLAIM

This application claims the benefit of U.S. provisional patent application No. 63/082,739, being filed on Sep. 24, 2020, which is hereby incorporated by reference in its entirety.

FIELD OF THE INVENTION

The present invention relates generally to tracking animals, such as pets, using a smart collar system, and to prevent animals from attacking other animals.

BACKGROUND OF THE INVENTION

Pet collars have long been used to provide identification information regarding the home or owner location of pets, particularly when lost. Collars are also often used as an attachment means for leashes or other retention mechanisms for walking etc. Recently smart collars have been used to detect location of animals using GPS location. Some smart collars include stimulus mechanisms to help train the animal or warn of danger. Training collars have been developed in attempt to train animals such as to train a dog when and when not to bark. Often these collars emit a shock or sound in response to an audible bark. However, these current systems are not as reliable or accurate, and certain situations compound the matter when there is a plurality of noises, some of which may be similar to a dog bark, or from another dog barking or in the environment. Improvements in these areas is desired and the present invention seeks to improve upon these in a novel manner.

One problem with pets, such as dogs or cats, is that the pet may attack and harm and kill wildlife. For example, stray cats and owned cats kill millions of birds a year in the United States and Canada alone. Cats are thought to have contributed to the extinction of 63 species of wild animals, mostly birds. Dogs are thought to have contributed to the extinction of nearly one dozen species of wild animals. Both cats and dogs are threats to hundreds of species worldwide including species of birds, mammals, reptiles, and amphibians.

SUMMARY OF THE INVENTION

Accordingly, it is desirable to have a system and method for identifying and deterring an animal from successfully attacking and injuring or killing another animal. The system includes an animal collar with built-in electronics that are utilized to detect animal motion, which motion is determinative of actions and of which actions can be used to determine and predict behavior and in particular preparing for or attacking behavior. Accordingly, the present application relates to systems and methods for detecting that an animal is about to attack another animal and to prevent the animal from attacking another animal.

In one such embodiment a method of deterring an animal from attacking, the method comprises: receiving signals from at least one sensor of a plurality of sensors disposed on a smart collar worn by the animal; analyzing the signals from the plurality of sensors to determine a behavior of the animal; comparing the determined behavior to behavior known to indicate that the animal is about attack; and providing a deterring stimulus configured to prevent the animal from attacking when the determined behavior is indicative of an animal that is about to attack or providing a warning stimulus configured to warn nearby animals or people.

The deterring stimulus can include at least one of: an audio stimulus, a vibrating stimulus, an electro-shock stimulus, and a visual stimulus.

The warning stimulus can include at least one of: an audio stimulus, a vibrating stimulus, a visual stimulus and a notification sent to a mobile device.

For both the deterring and warning stimulus features those can be generated by the smart collar, although in some variations third-party devices in the vicinity can also be triggered to generate the listed deterring and warning stimuli. For example, a remote Bluetooth or Wifi enable speaker.

The audio stimulus can generally be configured to startle an animal nearby thereby causing them to be alert or to flee.

The above embodiment can include recording a location of the animal when it is determined that the animal is about to attack. This can be used to update the animal behavior detection and deterrent algorithm used. It can also determine the mode the smart collar is operating in. Similarly, the smart collar or other device can be used to record sound signals when it is determined that the animal is about to attack.

The received signals can be processed and used to indicate movement of the animal, which can also determine one or more actions.

The determined behavior can include one or more sequential actions taken by the animal.

In another embodiment a method of training an animal attack detection and deterrent system comprises: setting an attack detection system, which is comprised of a smart collar, a remote server and database into a training mode; receiving a plurality of input signals from one or more sensors associated with the smart collar, wherein at least one sensor is a motion sensor; observing or inducing the animal to engage in a plurality of actions, including one of which is a simulated attack or part of a simulated attack; corresponding the received plurality of input signals to each of the observed actions; and updating an attack detection algorithm based on the observed actions and plurality of input signal data.

This embodiment can further include the steps of: changing the attack detection system training mode to deterrent mode; and recording signal data indicative of actions leading up to and a part of an attack. It can also include the steps of: recording location data associated with the attack; and recording ambient noise data associated with the attack.

In the above method the induced actions could include any of: walking, running, jumping, laying down, eating, pouncing, growling, digging, cuddling and sleeping or others known that the animal can replicate.

In yet another embodiment a smart collar for deterring an animal from attacking, the smart collar comprises: a power supply; at least one sensor configured to receives signals indicative of actions taken by the animal; a memory configured to store behavior patterns based on one or more actions that are indicative that the animal is likely to attack; a processor configured to determine if the received signals indicate a likely to attack behavior of the animal by identifying one or more actions based on the received signals and determining if those one or more actions are indicative of behavior similar to the stored behavior patterns; and a deterrent device configured to deter the animal from attacking, wherein deterrent device deters the animal from attacking or continuing to attack when the processor determines that the animal behavior is one that is likely to attack or already attacking.

The at least one sensor of the smart collar can include an accelerometer, gyroscope or altimeter that determines movement of the animal.

The signals detected by the one or more sensors can include a magnitude indicating the type of movement and an angular component indicating direction of movement.

The deterrent device of the smart collar can include a haptic device or an audio emitting device that emits an audio signal. Although as noted in another embodiment, these could also be external devices to the smart collar, but in communication with the smart collar.

Again, the audio signal(s) generated can be configured to warn nearby animals or persons.

Additionally, the smart collar can include a location determination device. This location determination device can be configured to temporarily disable the deterrent device when it is determined that the animal is located inside of its dwelling or other safety zone. The location determination device could be a WIFI transceiver configured to connect the smart collar to WIFI networks, Bluetooth transmitter, or even GPS device. In the variation where the smart collar is connected to a specified WIFI network the processor could be configured to not analyze the animal's actions or behavior. In such a manner the Wifi network or range is used to identify a particular zone.

The smart collar can also include a training mode in which the one or more sensor receives signals, which the user indicates which set of received signals are to be associated with certain actions, and of which of the one or more actions indicate behavior consistent with the animal about to attack or attacking.

Other variations and configurations will become evident in the detailed description below.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

This application describes a behavior detection system and implementation method. Part of the behavior detection system is training the system to discern what is and is not an attack on another animal and what is normal movement.

Figure 1A:
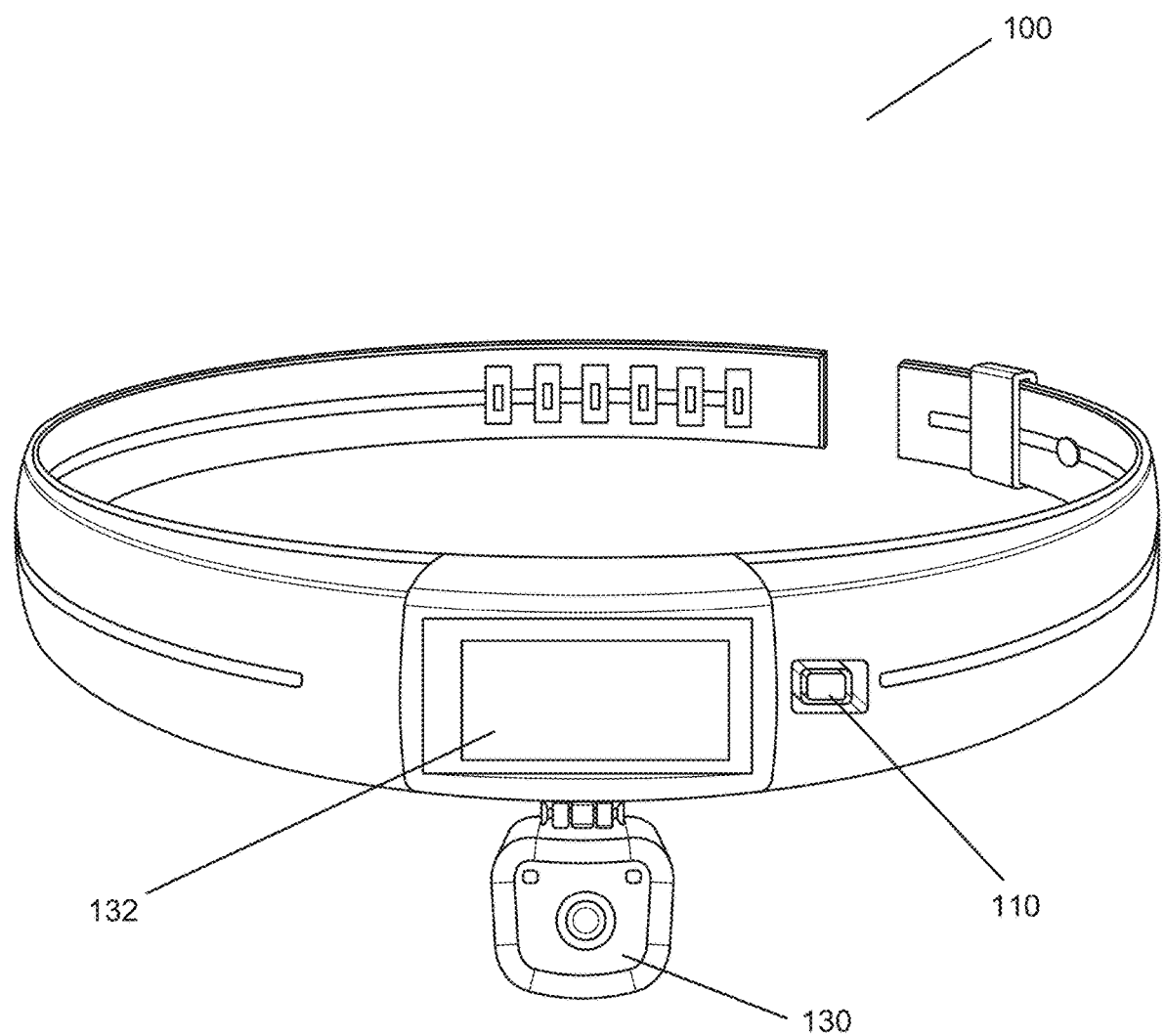
FIG. 1A illustrates a front perspective view of an exemplary pet collar for use in a location-based pet training system and a pet behavior detection system.
Figure 2:
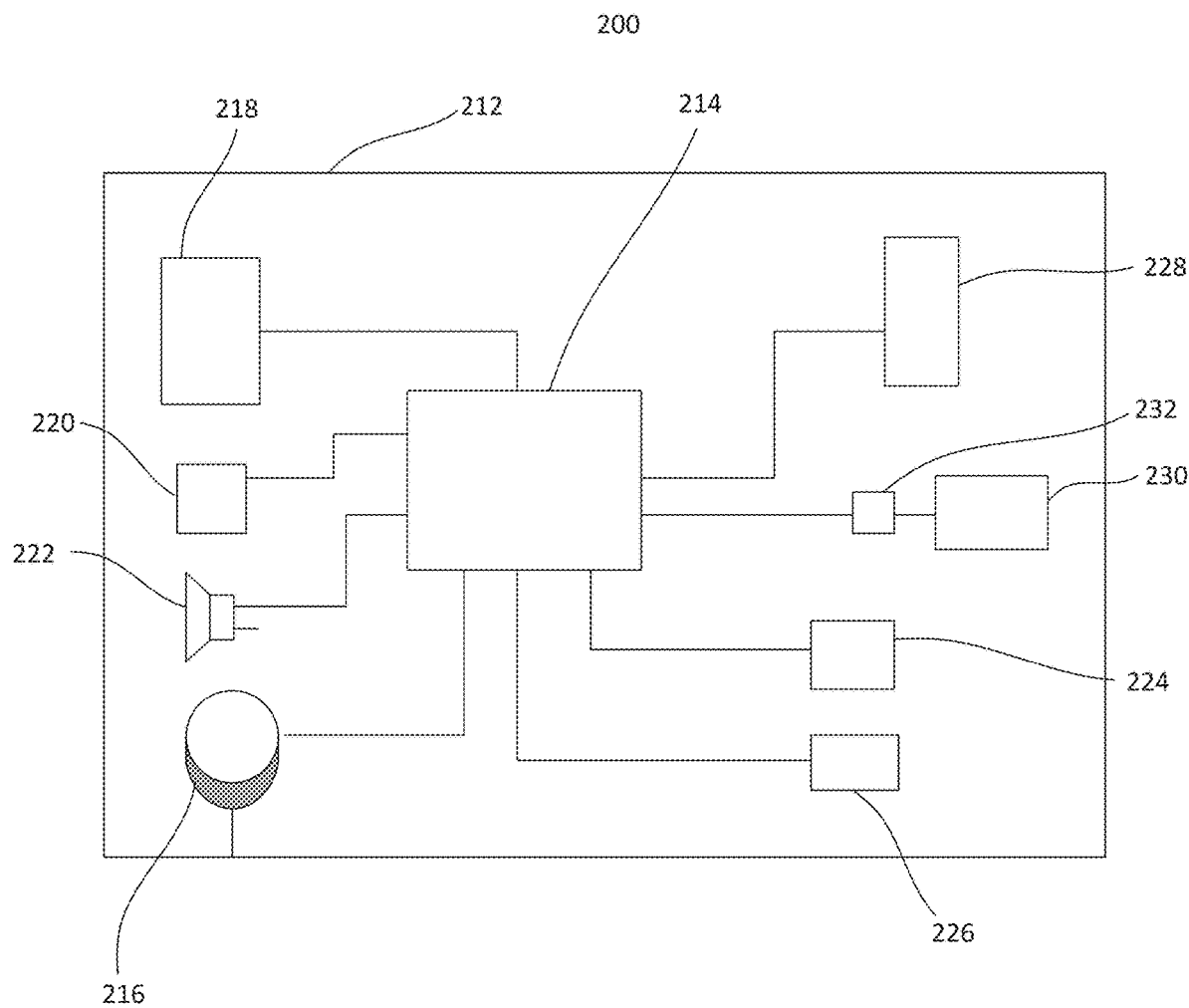
FIG. 2 illustrates an exemplary schematic of electronics provided in a pet collar for use in a location-based pet training system and pet behavior detection system.
Figure 3:
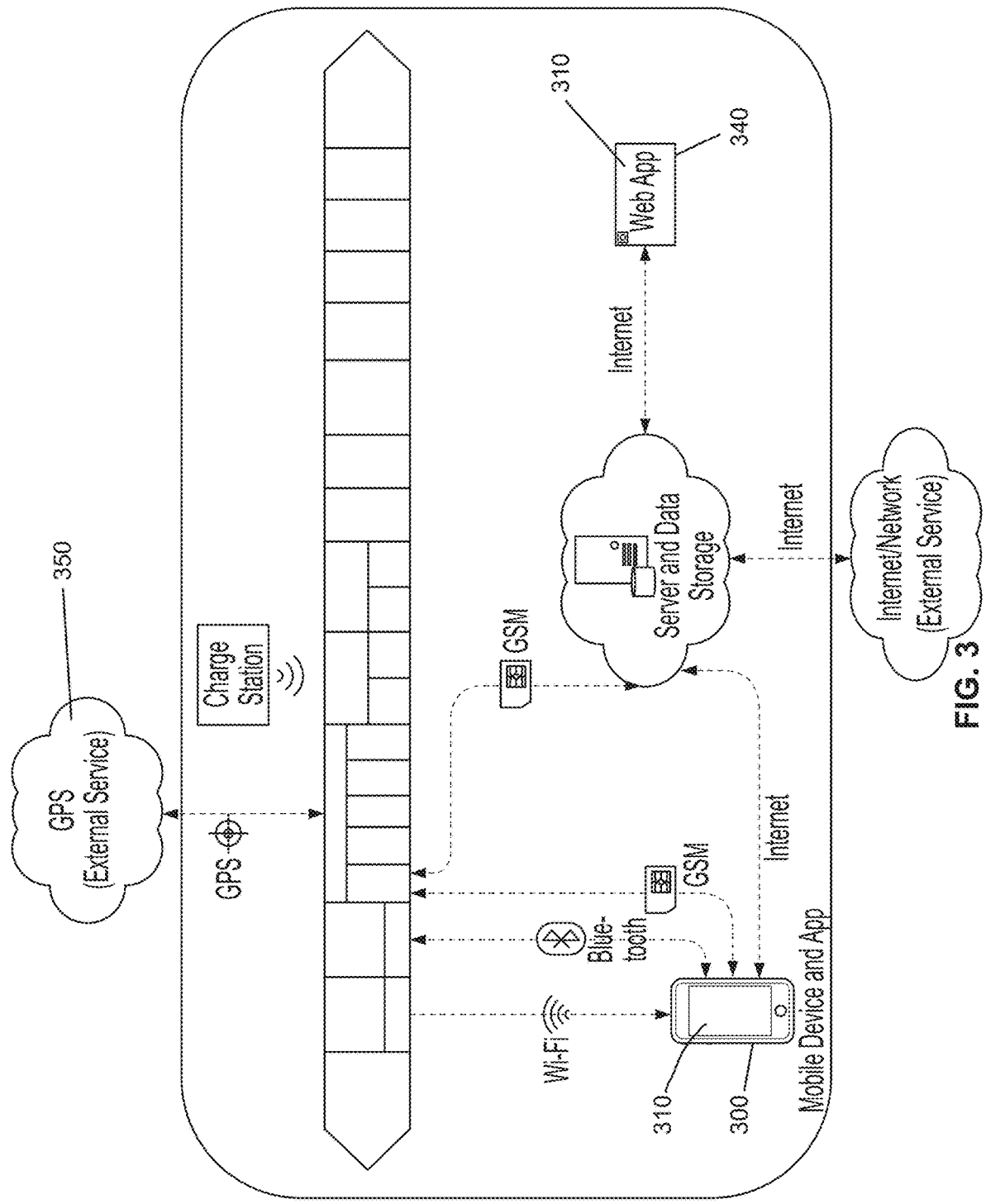
FIG. 3 illustrates an exemplary schematic of a location-based pet training system illustrative of various inventive concepts thereof.

FIG. 1A illustrates an exemplary dog collar 100 and FIG. 2 illustrates exemplary schematics 200 for electronic devices provided with the dog collar 100. The electronics 212 include a processor 214, connected to a power supply 216, one or more sensors 218, a haptic feedback device 220, one or more audio emitters 222, memory 224, one or more light emitting devices 226, one or more antennae 228, and an audio sensor 230. The power supply 216 is a battery and optionally a rechargeable battery that is recharged by providing a power cord to input 230 or alternatively a wireless charging NFC station. The one or more sensors 218 may include a variety of sensors such as 3-axis magnetometer, a 3-axis or 6-axis accelerometer, and/or gyroscope. An optical sensor can also be included in this list for detecting blood flow or heart beats. The one or more audio emitters 222 operate to emit ultrasonic sound or an audible-tone, such as a buzzer. The memory 224 may include various types of memory such as flash memory or random-access memory (RAM). The one or more light emitting devices 226 may include light emitting diodes (LEDs) that emit light in various colors such as white, red, green, or blue. The one or more antennae 228 may include various antennae such a global navigation satellite system (GNSS) antenna, a cellular communication antenna such as 3G, 4G, or 5G, or a printed circuit board antenna. The audio sensor 230 is a suitable device for recording audio waves such as a microelectromechanical systems (MEMS) microphone or an electret condenser microphones (ECM). A secondary processor 232 is electronically connected to the audio sensor 230. The secondary processor 232 is a very low power processor that is designed to run a coarse algorithm to determine if audio signals detected may be an animal or outside noise, which can then turn the primary processor 214 on to further determine the extent of the noise being outside noise or what type of animal, such as a bird, cat or dog. Operating in this manner helps preserve battery life. Operation of the system will be described in more detail below. In some embodiments, logic is directly built into the audio sensor, which can receive simple instructions to determine an initial threshold based on initial audio samples from the audio sensor.

Additionally, the collar system can include various sensors and interfaces including but not limited to a tangible display 132 providing pet identification information optical sensors, i.e. a cameras 130, a Global Positioning System (GPS) 110, RFID, infrared communication mechanisms, accelerometers, wi-fi adapters, Bluetooth adapters, SIM or GSM communication modules, temperature sensors, microphones, light sensors, ultrasonic, radio or virtually any other contemplated sensor which would be recognized by those having skill in the art as useful so as to provide a desired feedback regarding a pet activity, it will be appreciated that these various sensors are indicated by the single reference number, but can be provided as virtually any sensor which would provide information regarding a particular activity, parameter, or characteristic.

Additionally, display 132 of the collar can be an interactive display which can be used to access information or settings of the collar by a user. In some embodiments, the collar can also include lights as noted above or other indicia which can aid in pet location when lost, particularly at night or other dark conditions. Such a light can also be illuminated automatically in low-light conditions so as to aid in visibility, such as on walks for passing motorists, etc.

Figure 1B:
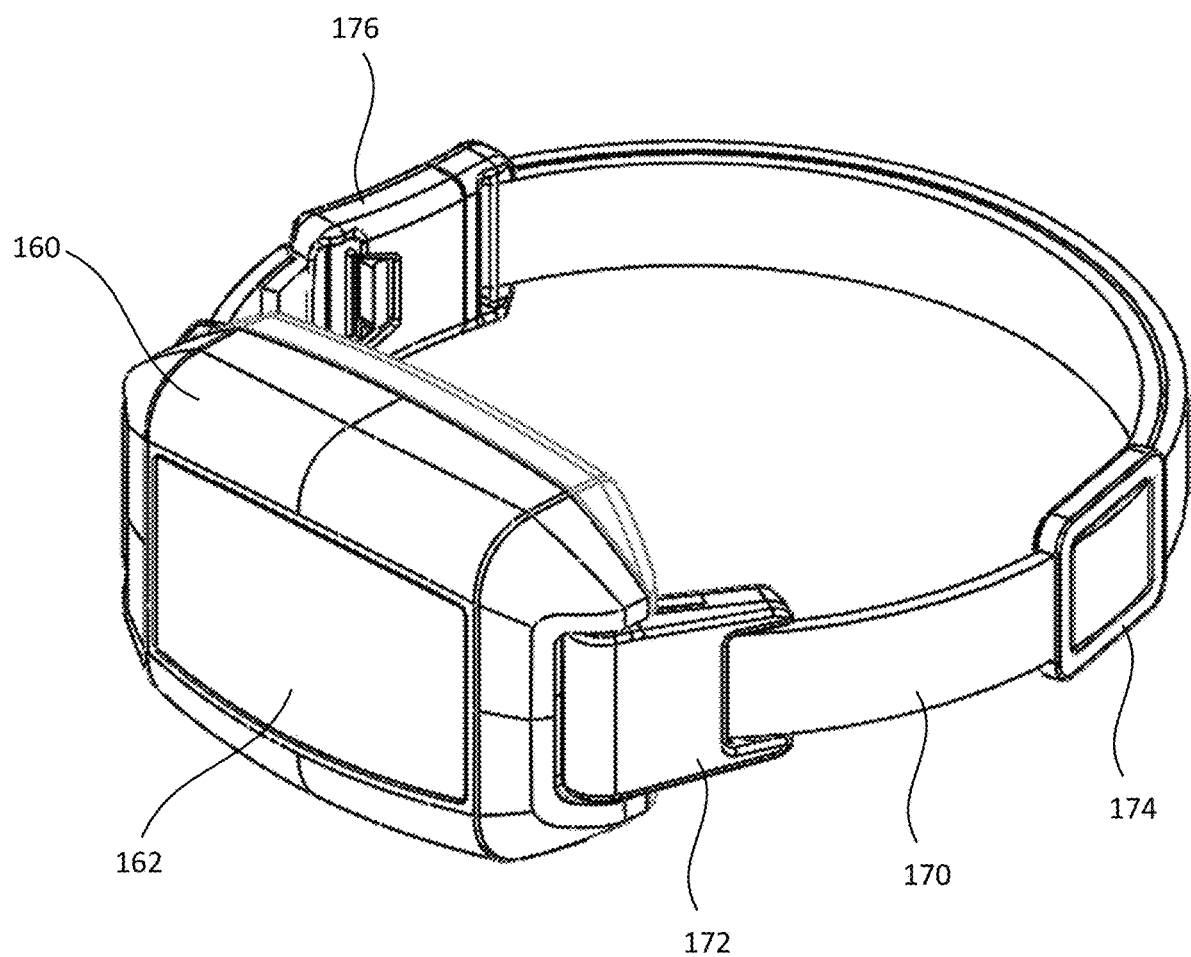
FIGS. 1B-C illustrate an alternate embodiment of a pet-collar system configured to be used as part of the pet-behavior detection and deterrent systems and methods.
Figure 1C:
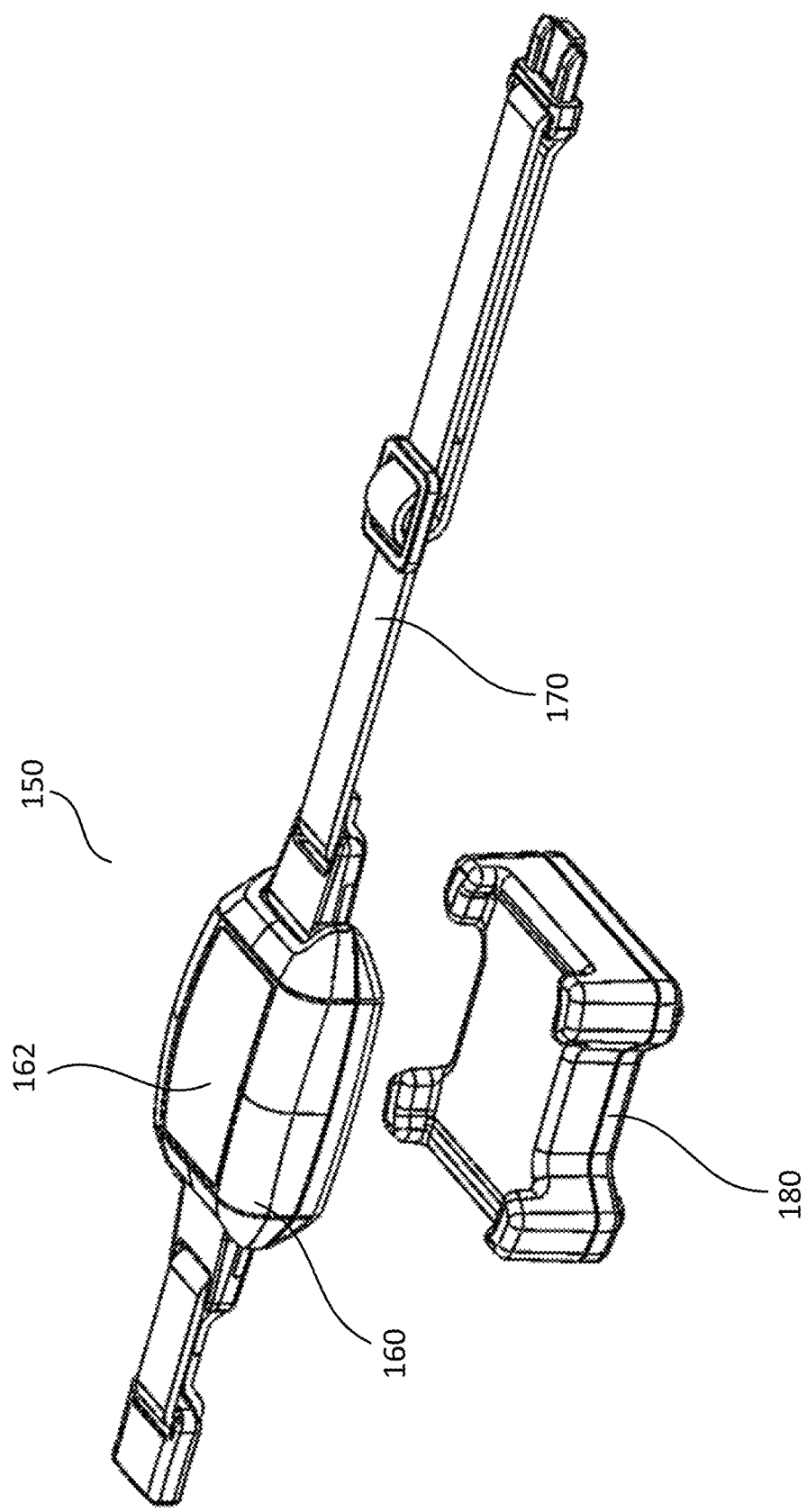

FIGS. 1B-C illustrate an alternate embodiment of a pet-collar system configured to be used as part of the pet-behavior detection and deterrent systems and methods described herein. FIG. 1B is perspective view of a collar 150 that includes a housing 160 that includes a display 162, which could be a touchscreen, connection strap 170 that connects to the housing via clips 172, that can be lengthened using lengthening mechanism 174, that also includes a connection mechanism 176 for quick release from around the neck of the animal or pet. In FIG. 1C a charging station or cradle 180 is shown to receive the housing portion of the collar 150 and charge using direct contacts or alternatively NFC charging means that are known in the art. Within the housing is stored the various electronics including power supply, processors, memory, communication means and sensors noted above and used to determine the behavior of the animal and in particular if the animal or pet is about to attack another animal.

The accelerometers are used to measure motion of the smart collar, which is indicative of the motion of the pet that this is wearing the smart collar. The measured motion can be used to determine an action or behavior of the pet. For example, if a pet is walking the accelerometer signal will indicate a steady pace of movement at a relatively low velocity. When the pet is running, the accelerometer signal will indicate that the animal is moving at a higher velocity. If the pet is inactive, the accelerometer signal will indicate no movement.

When a pet, such as a dog or cat is hunting, the pet will typically move slowly, come to a stop, crouch or otherwise get low to the ground, and then burst with speed at the prey. This series of behaviors and movements results in a series of accelerometer signals that will have a detectable waveform that indicates an imminent attack.

In order to differentiate between acceptable behavior and an attack on another animal, an attack detection algorithm has been developed to measure signal from the accelerometer. The signals from the accelerometer are analyzed to determine pet behavior or movement. When the signal form the accelerometer indicates that the animal is about to attack, then the smart collar enters into attack deterrent mode. Various flowcharts of how this accomplished are illustrated in FIGS. 4-7.

In one embodiment, the attack detection algorithm also includes using sounds sensed by the audio sensor 230. The audio sensor 230 senses sound around the collar 100, including sound made by the pet. Many pets make a sound before attacking, such as a growl or a hiss. The attack detection algorithm includes using sound signals that indicate the pet is about to attack.

In one embodiment, the attack deterrent mode includes a negative reinforcement stimulus that is applied to the pet in order to deter the pet from attacking another animal. The negative stimulus or action can include one or more of shocking the animal, using the haptic feedback to buzz the animal, playing an audio signal, connecting to the user's cell phone to allow the user to reprimand the animal, or playing an audio recording of the user reprimanding the animal.

In one embodiment, the attack deterrent mode includes playing an audio signal that is likely to warn or scare the animal that is about to be attacked causing the animal to flee making it more likely to avoid the attack.

In one embodiment, both a negative stimulus or action and playing an audio signal are provided. The audio signal may also be an audio signal that both deters the pet from attacking and startles the attacked animal into fleeing.

In one embodiment, the attack deterrent mode includes recording an audio signal received from the audio sensor 230. The recorded audio signal can be transmitted to the user to allow the user to listen to the attack. Also, the recorded audio signal can be used to determine sounds the pet makes during an attack and can be used to update the attack detection algorithm.

As described above and in more detail below, the collar 100 includes multiple sensors that can be used to determine the location of the collar 100. The location of the collar 100 can be used to turn on the attack detection algorithm and to turn off the attack detection algorithm. When a pet is located inside, such as in its owner's home, the attack detection algorithm can be turned off so actions such as the pet playing are not detected as potential attacks. When the pet location indicates that the pet is outside, the attack detection algorithm is turned on.

In one embodiment, the attack detection algorithm may be manually turned on or off by the user by using a mobile device in communication with the collar, or with a button on the collar 100 itself. This enables the user to turn the attack detection algorithm on while the pet is indoors if there are other animals around. Also, it enables the user to turn off the attack detection algorithm when the pet is outside and the user is not concerned about the pet attacking other animals.

The attack deterrent system also includes an algorithm training mode. In this mode, the collar 100 and the various sensors detect input while the pet is playing in a way that simulates attacking another animal. For example, a young cat may "hunt" a toy mouse attached to a string that is pulled by the user. The user enters the system into a training mode, and as the cat "attacks" the toy mouse, the sensor data is collected and analyzed. This collected and analyzed data is used to update and fine tune the attack detection algorithm.

A historical database, of positively detected attacks or attempted attacks, can be updated periodically as attacks are appropriately detected. This information can be further used to fine tune the algorithm to decipher between a pet playing with a pet about to attack another animal.

Figure 4:
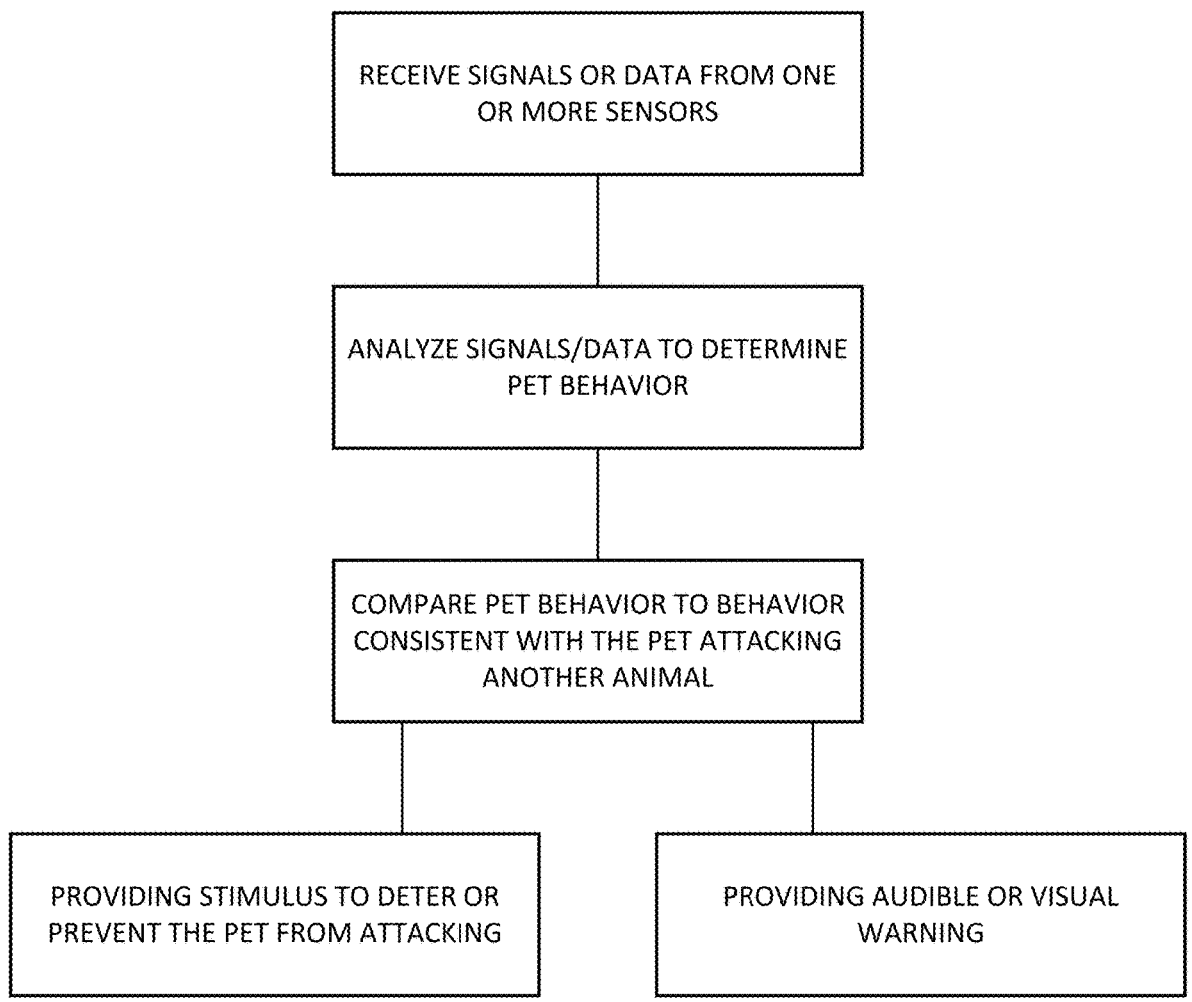
FIG. 4 illustrates a flowchart for an animal behavior detection system and deterrent method.

Also contemplated herein is a pet training and location system which can be utilized by a pet owner to train a pet to behave in a certain manner depending on the pet's particular location as determined by a collar being worn by the pet. The attack detection algorithm and system can be incorporated onto a collar such as shown in FIG. 4.

In accordance with these concepts, the system as contemplated can include a collar 100, as shown in FIGS. 1A-B, 2 which is configured to be affixed to a pet, the collar 100 can have a location determination mechanism 110 embedded therein which can provide a location of the pet. In some instances, the location determination mechanism can be a global positioning system (GPS) which can be utilized to provide a location of the pet within a certain degree of certainty using an external GPS location service 350. It will be appreciated that GPS is discussed herein in detail with the understanding that various location determination mechanisms can be utilized, including alternative sensors, triangulation methods, range finders, radio signals. Another particular example of setting up various permitted and restricted zones can include providing a wireless transmitter, such as a wi-fi transmitter, and wherein the permitted zone is defined as requiring the pet to stay within a distance of the transmitter to allow a particular signal strength, or maintain a wi-fi connection. The system can be provided with a user portal 310 or web app which can present an interactive map to the user. It will also be understood that the user portal 310 can be presented to the user or interacted with by the user via an application on a mobile device 300 or using an online web portal 340.

It will be appreciated that providing negative stimulus, such as through an electrode, and associated electric shock has been utilized in many previously known systems and is known as a relatively effective training method. However, one aspect of the present invention involves providing not only a negative stimulus for a negative behavior, but also allows for providing a positive stimulus for corrective behavior or desired behavior. In particular, one aspect of the present invention involves providing a positive stimulus when a pet stops barking after barking is detected. For example, when it is detected that a pet is barking and the pet is told, either by a person or person's voice recorded and stored in the collar, the pet receives positive stimulus. In order to provide positive stimulus, the system as contemplated can also include an audio transmitter, such as a speaker, which can be configured to provide an audio stimulus in the audible range or at ultrasonic frequencies which can be heard by the pet, but not the owner/user. In such cases, the audio transmitter can be configured to provide an audio signal which can be either pleasing or unpleasant to the pet in response to determined behaviors. The audio transmitter can provide positively trained sounds or recordings when positive activities are determined.

Further, it will also be understood that the audio transmitter can also be used for negative reinforcement, rather than using electric shock. In such cases the user can record a verbal reprimand, or some other negative reinforcement noise so as to provide a more humane negative reinforcement over the electric shock and electrode methodology.

In some embodiments, the user platform can include a dedicated screen in the application being devoted to hands-on training. As desired, the user can press a positive button to cause the collar to issue the positive reinforcement signal to help with real-time association of a particular sound with positive reinforcement. As such a separate button on the same screen can then cause the collar to issue the negative reinforcement signal(s) for real-time association of a particular sound with negative reinforcement.

With this interface, a trainer can perform general training with the collar's reinforcement signals instead of, or in addition to, traditional reinforcement signals.

It will also be understood that a power source, such as a battery, can be provided within collar which is configured to provide power to each of the aforementioned accessories, sensors, etc. The power source can be configured to be rechargeable either through a power port, or can incorporate wireless charging technology.

As discussed in some detail above, the system will include a user platform, such as an application, which can be configured to receive input from a user. It will be understood that the application/user platform can be accessed through mobile devices, web portals, or any number of suitable means. It will be understood that the platform is operable to define at least one permitted zone where the pet is permitted to reside and at least one restricted zone where the pet is restricted from entering. This can be achieved by defining or drawing boundaries, for example on a map.

Additionally, it will be understood that the collar can be provided with a local processing unit and non-transitory computer-readable media for tracking location or activities and saving data with regard to those activities locally. Such a local processor and non-transitory computer-readable media can store computer instructions wherein sounds, warnings, positive reinforcement, or negative reinforcement steps and when applied can each be determined locally and performed locally after transfer of such instructions from the user platform. Accordingly, the user platform can be connected to a remote server having a remote processor and non-transitory computer-readable media can be utilized remotely, and instructions can then be transmitted to the collar to perform any such step or action using a mobile or home network.

The system can also include processing capabilities and data storage capabilities which allow for activities to be determined, stored, and enter a desired mode based on a predetermined set of instructions in response to input or commands from the various sensor or commands provided through the communication systems. In some instances, pet data can be transmitted and stored over an external network or service for data tracking of various pet activities, parameters, etc.

In various aspects of the present invention the various sensors can be divided into various primary groups and subset groups. In response to various sensor inputs the collar can be prompted to enter into various modes wherein various primary and subset groups. For example, the audio sensor or microphone in combination with an accelerometer can detect for example when a dog is barking, in response to a detected barking over a predetermined timeframe, in response the collar can then activate the optical sensor or camera so as to detect or otherwise capture an image or video of what the dog is barking at. It is thus contemplated herein that various sensors can be primary sensors and can cause the collar to enter various modes wherein various sensor subsets are activated or deactivated in response to sensor input. It will be appreciated that the collar system and application can have a predetermined mode set, and in some instances custom modes can be created or certain sensors can be manually controlled using the mobile application.

The mobile application, which can be specifically designed to connect to the collar using Bluetooth technology on a smart device, can allow for control of the collar itself in real-time. For example, an active mode or a user connected mode can allow the pet to leave a predetermined area without signaling alerts to a previously defined area perimeter.

In yet additional embodiments the collar system can be connected to a control system or program during a charging process or other hard connection means when not being worn by the pet. Such connection and charging means can be provided using USB or other serial connections and charging methods.

It will be appreciated that a speaker can be provided wherein the user/owner can give verbal commands, positive reinforcement or otherwise. In other embodiments, negative reinforcement mechanisms such as vibrators or shock electrodes can be provided so as to provide negative reinforcement for certain behaviors. Each of these functions can be automatically activated or alternatively manually activated via the mobile smart device of the owner/user using the control application.

In certain embodiments, the control application can be utilized to customize a collar response by registering each of the individual independent proximity sensors and saving a profile therefore which prompts specific stimuli based on the proximity thereto. For example, a sensor on a cat and a sensor on a dog can prompt a negative response to discourage the dog from chasing the cat.

In yet additional embodiments certain collar responses can be customized by a user using the control application, such as a custom recording including particular and customized praise(s)/reprimand(s) to be played back by the speaker based on a sensed proximity to a particular item or boundary.

FIG. 4 illustrates a flowchart for an animal behavior detection system and deterrent method 400. As noted above, the smart collar can receive various signals and data from the one or more sensors. These signals and data are then analyzed to determine the behavior of the animal, for example is the animal resting, walking, eating or getting ready to or already attacking something such as another person, animal, or toy. If the behavior is indicative of getting ready to attack or already attacking then the smart collar can provide a stimulus to the pet to deter it from continuing to attack. If the pet is about to attack then again, a stimulus can be provided to deter the pet from fully engaging or attacking. Alternatively, an audible or visual warning can emit from the smart collar to warn the person or animal that the pet is about to engage them, which can allow the 'prey' an opportunity to escape or defend themselves. This is particularly useful when the animal is a small animal such as a bird, where flashing lights and noise can alert them to fly away.

Figure 5:
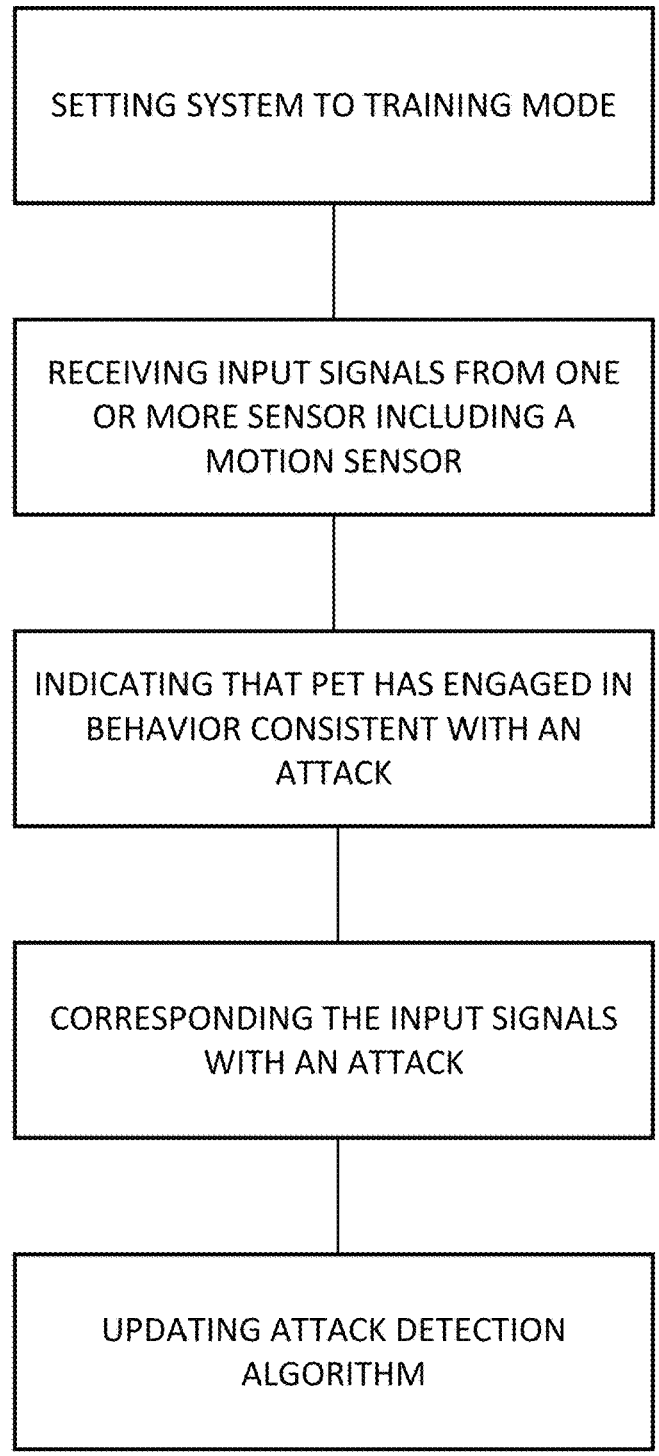
FIG. 5 illustrates a flowchart for a learning mode of the animal behavior detection system.

FIG. 5 illustrates a flowchart for a learning mode of the animal behavior detection system and method 500. The smart collar can be set to a training mode, which begins tracking various data associated with the behavior of the animal. This is done through the various sensors as noted above. Some of the data can be compared with a historical database of the pet and/or database of data indicative of that type of behavior to determine if the sensed data corresponds. For example, if the smart collar is in training mode and the animal is observed walking over to a food dish, consuming food, and then walking back to lay down, those behaviors can be confirmed, which can then be used to update the animal behavior algorithm on the smart collar with that particular pet. In some instances, the user can use toys to induce the pet into attacking or going after the toy to model behavior indicative of the pet when they are about and begin attacking. Again, once this behavior has been observed it can be used to update the attack detection algorithm, which can be part of the animal behavior algorithm or a separate algorithm that runs only when triggered to do so.

Figure 6:
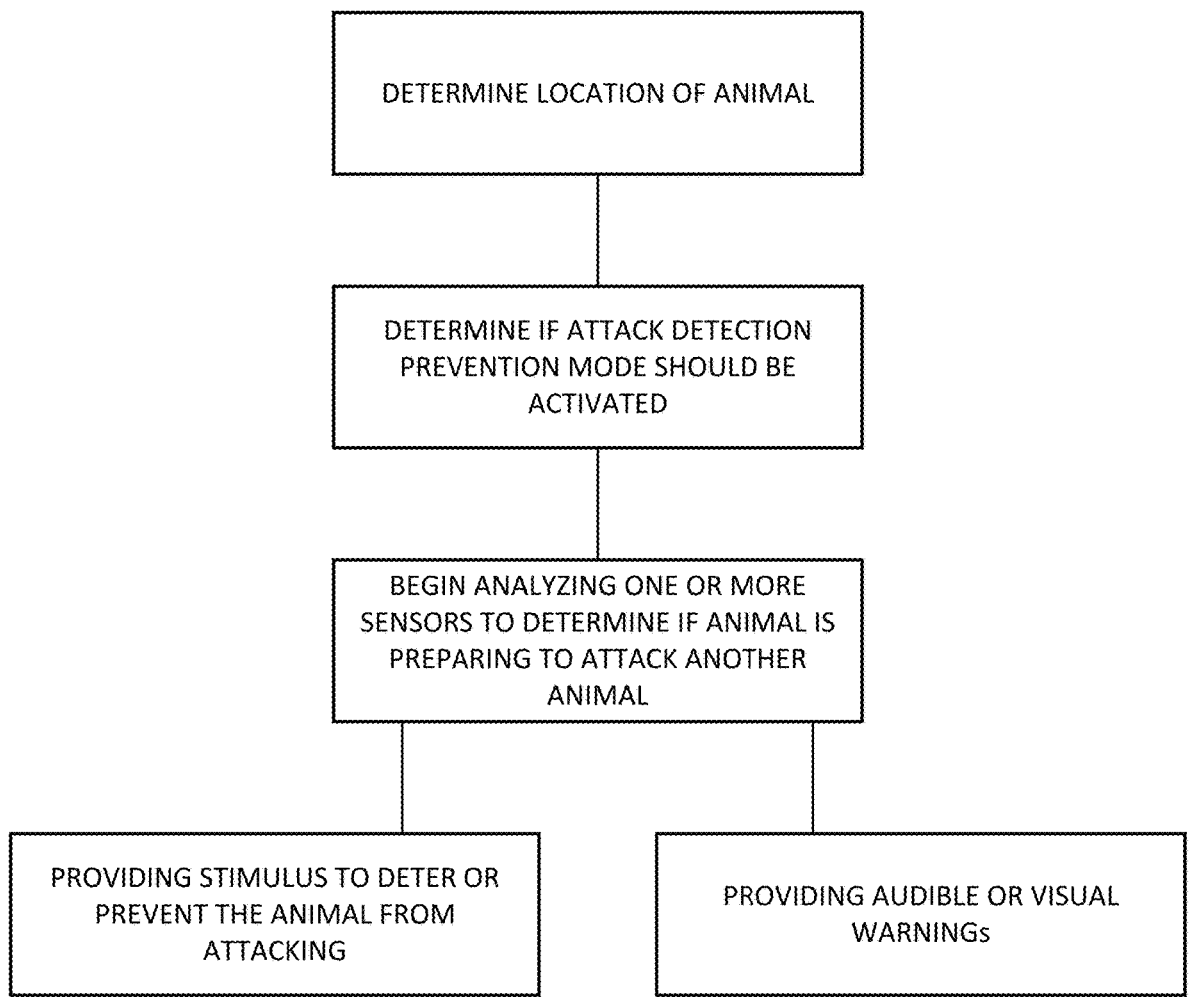
FIG. 6 illustrates a flowchart detecting the location of an animal to determine if an attack detection prevention mode should be activated.

FIG. 6 illustrates a flowchart detecting the location of an animal to determine if an attack detection prevention mode should be activated for system and method 600. As alluded to above, the location of an animal can be one mechanism used to determine if an attack detection prevention mode should be activated. For example, if the pet is within the house, the likelihood of the pet attacking a small animal or stranger are less likely to occur, thus there may not be a need to actively use the attack detection algorithm to process sensed data, as well as certain sensors may not even be activated. However, if for example, it is determined the pet goes outside, the attack detection prevention mode can be activated and begin analyzing to determine if the animal is about to engage in attacking or aggressive manner and if determined utilize stimulus or warning mechanisms to deter the attack from happening or continuing.

In alternative to using location information, audible noise can also be used. For example, the ambient noise changes from being inside to being outside. Thus, if the ambient noise is indicative of being outside that can then trigger the attack detection prevention mode to be activated.

Figure 7:
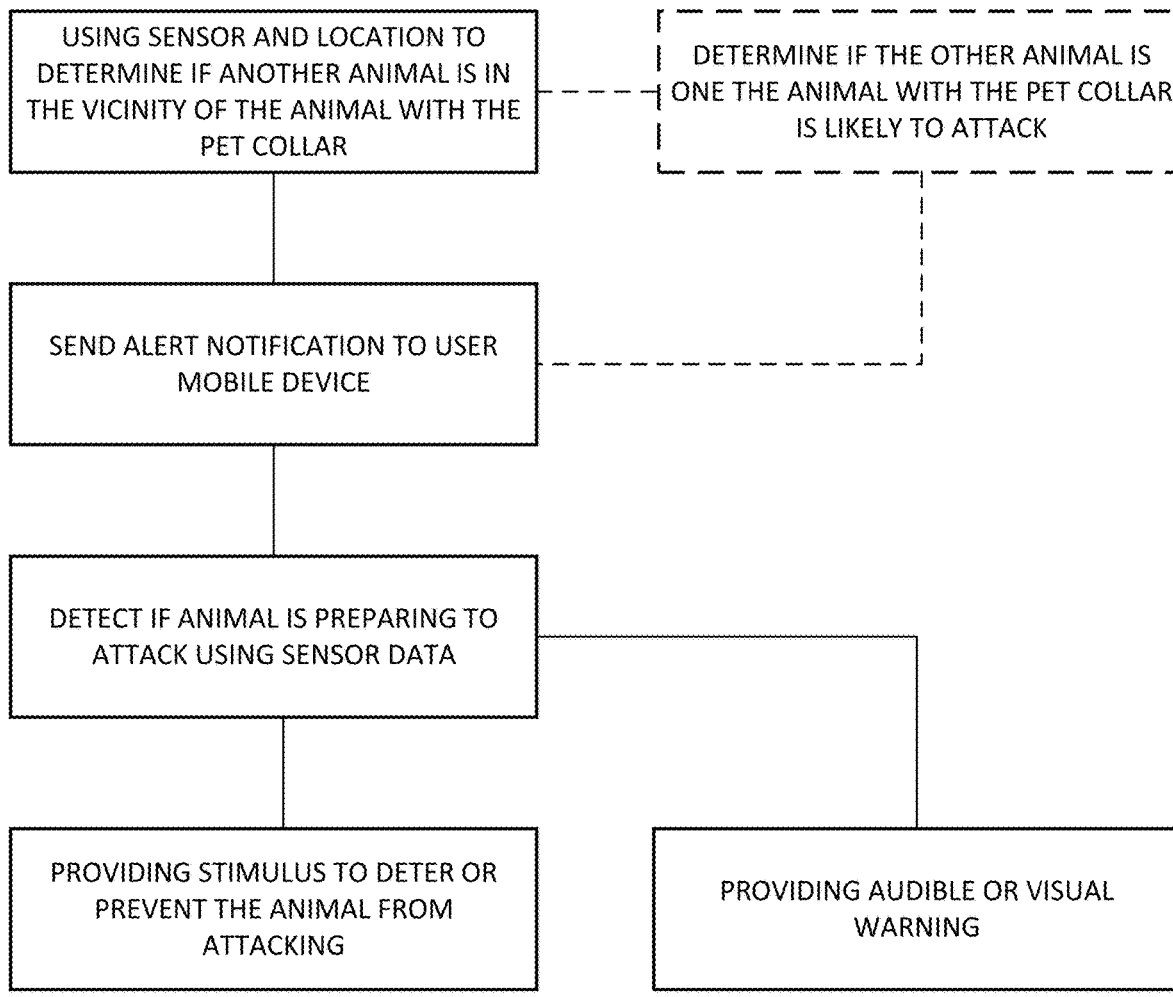
FIG. 7 illustrates a flowchart determining if other animals are in the vicinity and whether or not to activate an attack detection prevention mode as well as alerting a user.

In yet another alternative, the microphone can be used to further analyze the ambient noise to determine if other animals or persons are in the vicinity. FIG. 7 illustrates a flowchart determining if other animals are in the vicinity and whether or not to activate an attack detection prevention mode for system and method 700. Two paths can occur, where if an animal or person is within the vicinity and the animal might attack them, an alert can be sent to the user. This can enable the user to monitor the situation or even in some situations send commands or warnings to the animal via the smart collar to not engage. The system could also begin further analyzing those sounds to determine to the extent if the person or animal is one the pet is likely to attack. If so, again the attack detection prevention mode is activated and used to prevent the attack from occurring. The mere presence of a potential threat of attacking can also be a trigger to send visual or periodic audible sounds via the smart collar to warn would be attacked persons or animals of the pet's presence. This could be done even if the animal had not engaged in attacking behavior and provide ample warning.

Figure 8:
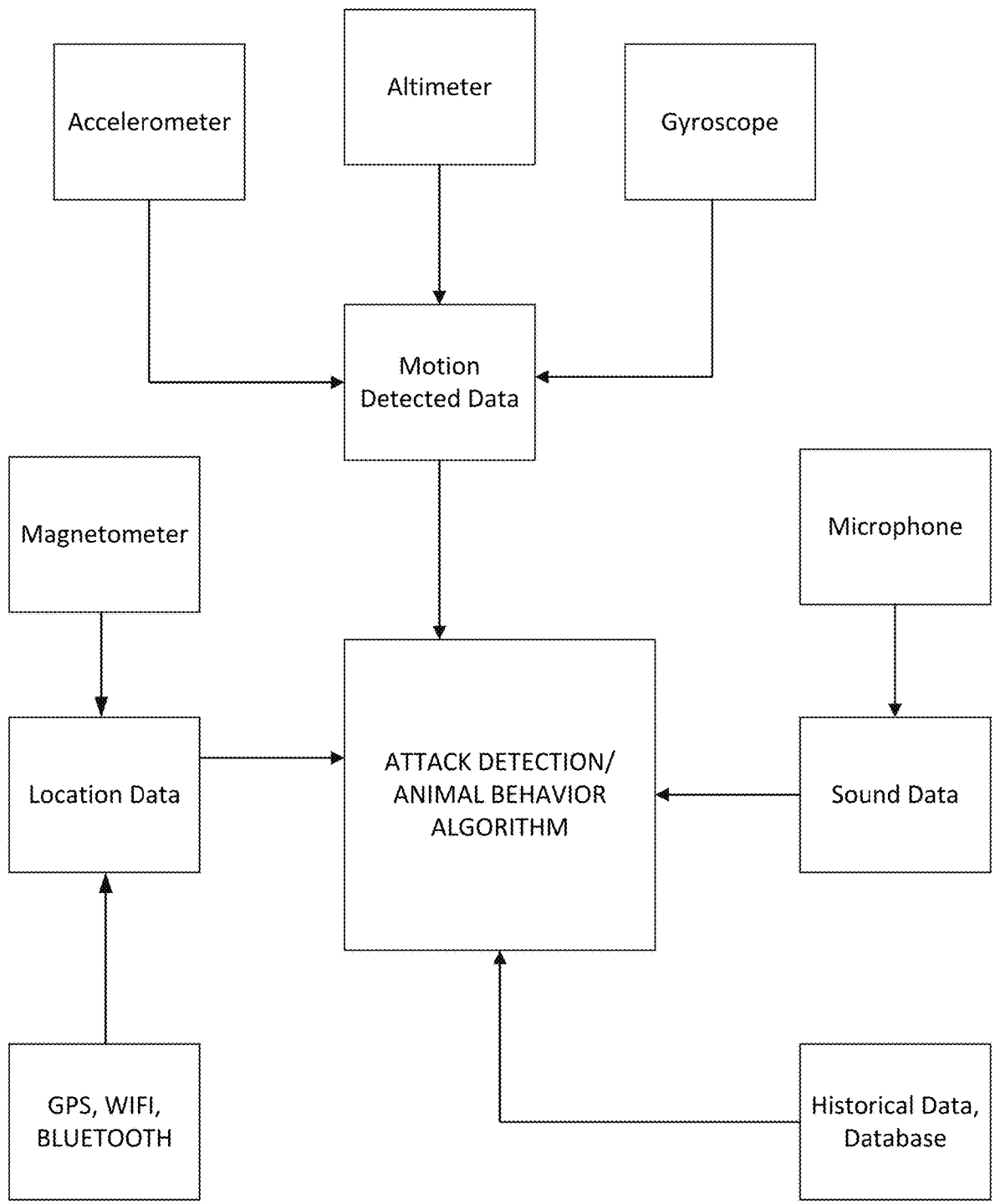
FIG. 8 illustrates a schematic of data and sources as inputs for an attack detection/animal warning algorithm.

As noted above, there are various sensors that can be used along with historical and other animal behavior datasets in remote databases that utilized by and used to improve the attack detection and animal behavior algorithms. FIG. 8 illustrates a schematic 800 of these data and sources used as inputs for an attack detection/animal warning algorithm. As shown, accelerometer, altimeter, and gyroscope sensors can provide data that is used as detected motion data. Sound data can come from the microphone. Location data can come from GPS, WIFI, Bluetooth or even magnetometers. Each of these sets of data can be used to determine the type of animal behavior and if deterrent mechanisms need to be initiated by the algorithm. This received data can be stored and later uploaded to a remote database and further analyzed to improve upon the algorithms and in particular the algorithm used for the particular pet associated with the smart collar. For example, some animals tend to rotate their necks, which can be picked up by the gyroscope before they pounce or attack. Some animals' heartbeats change abruptly before they engage in attacking behavior. Some animals make natural noises when they are walking, eating, playing or sleeping, but then stop right before they are about to attack. Some animals like dogs begin to growl and in a unique manner. Some animals crouch, which can be detected using the altimeter. These are examples of the types of inputs that can be received and used by the attack detection and animal behavior algorithms.

Figure 9:
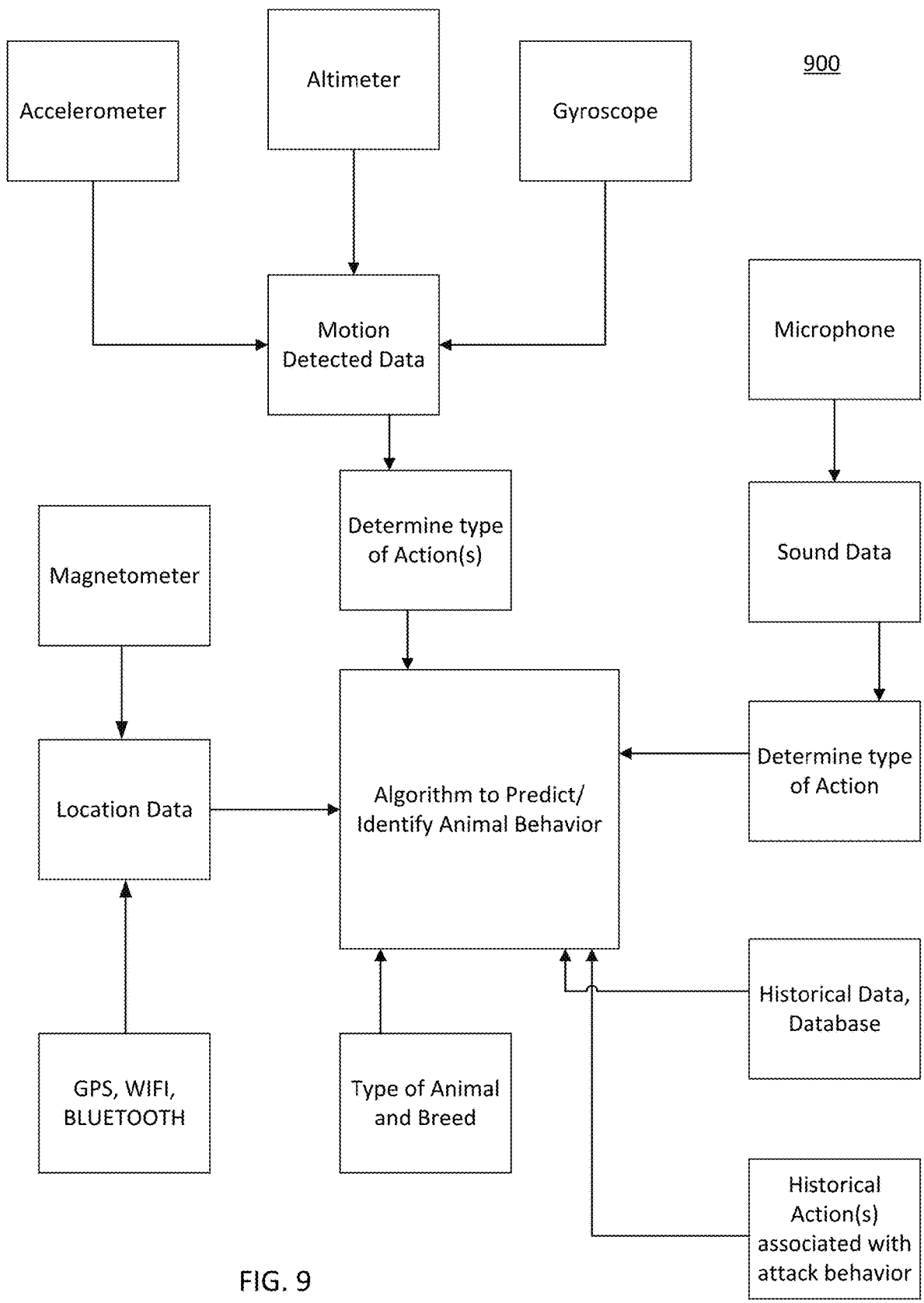
FIG. 9 illustrates another schematic of data and processing sources inputs for determining animal behavior.

FIG. 9 illustrates another schematic of data and processing sources inputs for determining animal behavior. Similar to schematic 800, schematic 900 further breaks down how signals received from sensors can used to determine actions, and those actions can be used alone or in conjunction with other data to determine animal behavior. It should be further noted that actions used to indicate behavior of an animal can vary from animal based on type and breed. Furthermore, an owner's particular animal can have its own set of characteristics, which is one reason recorded historical data and previous action data recorded by the system using the smart collar or other means, such as mobile devices, or manual user inputs, can improve the algorithm at the center of the schematic 900.

It should be understood if not already, that these algorithm's can be learning algorithms, which include supervised learning, which includes the user input data, unsupervised learning, which includes gather data from multiple smart collars and animals to generate a database of signal information that can be used to refine determined actions and ultimately predicted behavior, as well as reinforcement learning which is known in the art. As noted, the type of sensor data, location, audio and historical data are used to ultimately enable the methods and systems above to deter and warn, as well as improve with usage.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed:

1. A smart collar for deterring an animal from attacking, the smart collar comprising:
   a power supply;
   a deterrent device configured to output a corrective action to discourage the animal from attacking;
   a warning mechanism configured to output a sound;
   a microphone configured to detect sound output by the animal and output sound data;
   an accelerometer configured to detect movement of the animal and output movement data;
   an altimeter configured to detect an altitude of the smart collar and output altitude data;
   a memory configured to store behavior patterns corresponding to one or more actions that are indicative of the animal being likely to attack;
   a primary processor configured to:
      determine if the sound data, the movement data, and the altitude data are indicative of the animal being likely to attack by determining if the detected sound, detected movement, and detected altitude correspond to one or more of the stored behavior patterns based, at least in part, on determining that the detected movement comprises a sequence of a stop, a crouch, and then a burst of speed;
      in response to determining that the sound data, the movement data, and the altitude data are indicative of the animal being likely to attack:
         cause the deterrent device to output the corrective action to discourage the animal from attacking; and
         cause the warning mechanism to output the sound to warn nearby animals or persons; and
      in response to determining that the smart collar is connected to a predetermined WIFI network indicative of the smart collar being in a safety zone, prevent the deterrent device from outputting the corrective action,
   wherein the microphone is further electronically connected to a secondary processor, the secondary processor being configured to consume less energy than the primary processor.

2. The smart collar for deterring an animal from attacking of claim 1, wherein the movement data from the accelerometer includes a magnitude indicating the type of movement and an angular component indicating direction of movement.

3. The smart collar for deterring an animal from attacking of claim 1, further comprising:
   a location determination device.

4. The smart collar for deterring an animal from attacking of claim 3, wherein the smart collar is configured to temporarily disable the deterrent device when it is determined that the animal is located inside of its dwelling or other safety zone.

5. The smart collar for deterring an animal from attacking of claim 1,
   wherein, when the collar is connected to the predetermined WIFI network, the primary processor does not analyze the animal's actions or behavior.

6. The smart collar for deterring an animal from attacking of claim 1, wherein the smart collar has a training mode in which a user indicates which of the sound data and movement data indicate behavior consistent with the animal about to attack or already attacking.

7. The smart collar for deterring an animal from attacking of claim 1, wherein the microphone is configured to detect an ambient noise, and wherein the primary processor is further configured to analyze ambient noise detected by the microphone to determine if other animals or persons are near the smart collar.

8. The smart collar for deterring an animal from attacking of claim 7, wherein the primary processor is further configured to activate the deterrent device in response to determining that other animals or persons are near the smart collar.

9. The smart collar for deterring an animal from attacking of claim 7, wherein the primary processor is further configured to activate the warning mechanism in response to determining that other animals or persons are near the smart collar.

10. The smart collar for deterring an animal from attacking of claim 1 further comprising a camera configured to capture an image or video.

11. The smart collar for deterring an animal from attacking of claim 10, wherein the primary processor is further configured to activate the camera when the primary processor determines that sound data from the microphone is indicative of the animal barking.

12. The smart collar for deterring an animal from attacking of claim 1, wherein the primary processor is further configured to determine whether the animal is indoors or outdoors.

13. The smart collar for deterring an animal from attacking of claim 12, wherein, when the animal is determined to be indoors, the primary processor is further configured to cease determining whether the sound data from the microphone and the movement data from the accelerometer are indicative of the animal being likely to attack.

14. The smart collar for deterring an animal from attacking of claim 1, wherein the secondary processor is configured to determine whether the sound data is indicative of an outside noise and, in response to determining that the sound data is indicative of the outside noise, activate the primary processor.

* * * * *